A. S. CUBITT.
WATER HEATER.
APPLICATION FILED NOV. 26, 1910.

1,171,929.

Patented Feb. 15, 1916.

Witnesses:
George W. Tilden
J. Ellis Glenn

Inventor:
Archibald S. Cubitt,
by Albert G. Davis
His Attorney.

UNITED STATES PATENT OFFICE.

ARCHIBALD S. CUBITT, OF PITTSFIELD, MASSACHUSETTS, ASSIGNOR TO GENERAL ELECTRIC COMPANY, A CORPORATION OF NEW YORK.

WATER-HEATER.

1,171,929. Specification of Letters Patent. Patented Feb. 15, 1916.

Application filed November 26, 1910. Serial No. 594,276.

*To all whom it may concern:*

Be it known that I, ARCHIBALD S. CUBITT, a subject of the King of Great Britain, residing at Pittsfield, county of Berkshire, State of Massachusetts, have invented certain new and useful Improvements in Water-Heaters, of which the following is a specification.

This invention relates to electric water heaters and the like and has for its object the provision of a device of this character in which the temperature to which the water is raised may be regulated in a simple and efficient manner.

My invention in one of its aspects comprises an electric water heater in which the flow of water is controlled by the temperature to which the water is raised. In this aspect my invention is applicable to water heaters of the continuous flow type. As applied to this type of heater, my invention takes the form of a governor or controller which causes the flow of water to vary with the temperature of the water. This governor may be in the nature of a thermostatically controlled valve which, as the water heats, opens so as to increase the flow and thereby maintain a practically constant temperature.

In another aspect my invention relates to water heaters of the type in which the water is heated by passing the electric current through the water. In one form I provide an electrolytic water heater in which the water passage between the electrodes is controlled thermostatically. In one specific embodiment I arrange the electrodes so that they are both fixed, and a movable bridging or connecting member is provided. The movable member is carried by a thermostatic element which is subjected to the temperature of the heated water. As the water changes in temperature the thermostatic element will bend back and forth and thereby move the member so as to vary the water passage and thus change the temperature of the water and have a tendency to keep it constant.

Other objects and purposes of my invention will appear in the course of the following specification in which I have disclosed my invention embodied in concrete form for purposes of illustration.

Figure 1:
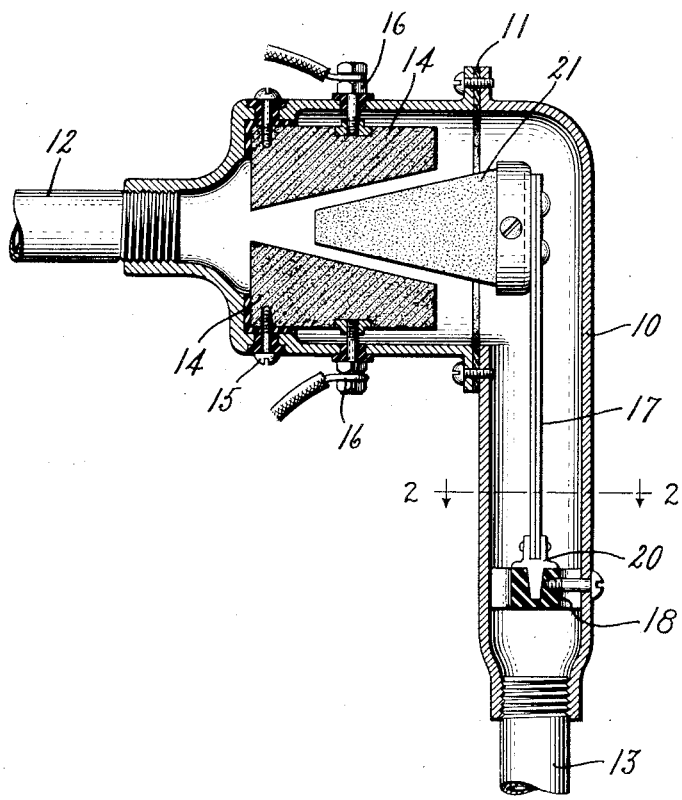
Figure 2:
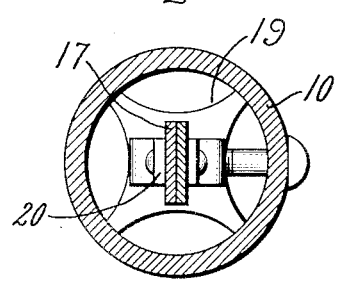

In the accompanying drawing disclosing one form of my invention, Figure 1 is a longitudinal section of my device; and Fig. 2 is a section on the line 2—2 looking in the direction of the arrows.

Referring to the drawings, 10 represents a metallic casing through which the water to be heated flows. This casing I have shown of angular form composed of two parts connected by a water-tight joint at 11. The two ends of this casing are reduced in diameter, as shown, to receive the intake pipe 12 and the discharge pipe 13. Mounted in the horizontal portion of the casing, which is larger than the vertical portion, are a pair of electrodes 14. These electrodes, which may be of carbon or other suitable material, are made wedge-shaped and are secured in the casing so as to leave a tapered or wedge-shaped space between them. The electrodes are insulated from the casing and secured thereto by the screws 15. Terminals 16 pass through the casing into electrical contact with the electrodes and are insulated from the casing.

In the vertical portion of the casing there is mounted a thermostatic element 17 which may be made in any well-known manner, as, for instance, by securing together strips of materials having different coefficients of expansion, as, for instance, iron and brass. This thermostatic element is mounted in a block of insulating material 18 secured within the casing, the block being cut away on four sides as at 19, so as to permit the water to pass through it. The thermostatic element is secured to this block by clamping member 20 which has a jaw at one end for receiving the element while the other end is inserted in the insulating block. Upon the upper end of the thermostatic element is an electric conducting member 21 which is wedge-shaped to correspond with the adjacent faces of the electrodes. This member, which may likewise be of carbon, partially closes the passage between the electrodes and by moving the member in and out of the passage, the size of the passage for the water between the electrodes may be varied and the effective passage area decreased or increased. This member 21 therefore acts as a regulator, and in coöperation with the fixed members constitutes a valve.

When the water which enters through the pipe 12 passes between the electrodes 14, which are connected with a source of current, it is heated. The current passes from one terminal 16 to the corresponding electrode, thence through the water to the member 21, thence again through the water to the opposite electrode and terminal 16. The water being thus heated passes out through the discharge pipe 13. If the water becomes too hot the thermostatic element which is located so as to be affected by the temperature of the water moves the member 21 outwardly so as to enlarge the passages between the electrodes and the member. This, of course, reduces the temperature of the water. Likewise, when the water becomes too cold the member is moved inward, thereby increasing the temperature of the water. In this way the water can be kept at a practically constant temperature.

It is obvious, of course, that the particular arrangement of the electrodes and the provision of the regulating member are not essential to my invention, the main feature of which is in the regulation of the temperature of the water by automatically adjusting the size of the passage for the water, since various modifications of my invention will suggest themselves to those skilled in the art without departing from the spirit of my invention, the scope of which is set forth in the annexed claims.

What I claim as new and desire to secure by Letters Patent of the United States, is:—

1. A water heater comprising a member defining a passage through which water flows to be heated, electrical means associated with said member for heating the water, and means controlled by the temperature of the heated water for varying the effective area of said passage.

2. A water heater comprising a member defining a passage through which water flows to be heated, electrical means located within said passage for heating the water, and means controlled by the temperature of the heated water in said passage for varying the effective area of said passage.

3. An electric water heater comprising electrodes between which water passes to be heated, and means responsive to changes in temperature for varying the effective passage area between said electrodes.

4. An electric water heater comprising a pair of conducting members between which water passes to be heated, and means responsive to changes in temperature for varying the position of said members with reference to each other.

5. An electric water heater comprising a fixed and a movable conducting member between which water passes to be heated, and means responsive to changes in temperature for moving said movable member with reference to said fixed member.

6. An electric water heater comprising a pair of conducting members between which water passes to be heated, and a thermostatic element supporting one of said members so as to move it with reference to the other member.

7. An electric water heater comprising a pair of electrodes spaced apart, an electrical conducting member located in said space, and means responsive to changes in temperature for varying the effective passage area between said member and said electrodes.

8. An electric water heater comprising a pair of electrodes spaced apart, a thermostatic element, and a conducting member between said electrodes and moved by said element upon changes of temperature.

9. An electric water heater comprising a pair of electrodes having a tapered space between them, a conducting member located in said space, and means responsive to changes in temperature for varying the effective passage area between the electrodes and said member.

10. An electric water heater comprising a pair of electrodes having a tapered space between them, a tapered conducting member located in said space, and a thermostatic element supporting said member so as to move it in response to changes in temperature.

In witness whereof, I have hereunto set my hand this 22nd day of November, 1910.

ARCHIBALD S. CUBITT.

Witnesses:
WM. MAYNARD,
J. C. MUSGROVE.